Figure 1:
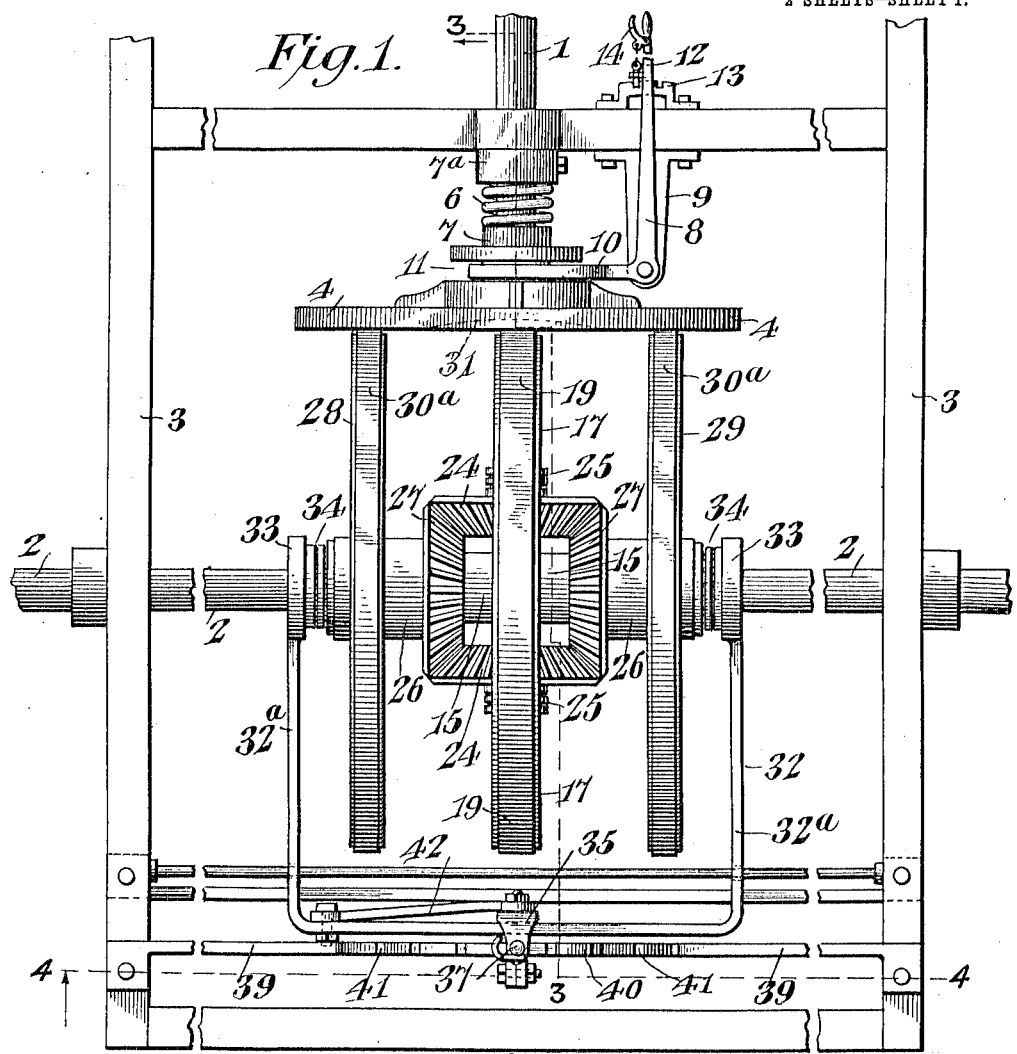

F. D. GREEN.
VARIABLE SPEED GEARING.
APPLICATION FILED JAN. 18, 1913.

1,081,954.

Patented Dec. 23, 1913.

2 SHEETS—SHEET 1.

WITNESSES

INVENTOR
Frederick D. Green,
BY
ATTORNEY

F. D. GREEN.
VARIABLE SPEED GEARING.
APPLICATION FILED JAN. 18, 1913.

1,081,954.

Patented Dec. 23, 1913.
2 SHEETS—SHEET 2.

WITNESSES
Jas. E. McCathran
F. T. Chapman.

Frederick D Green,
INVENTOR

BY
E. G. Siggers
ATTORNEY

UNITED STATES PATENT OFFICE.

FREDERICK D. GREEN, OF CORINTH, MISSISSIPPI.

VARIABLE-SPEED GEARING.

1,081,954.   Specification of Letters Patent.   Patented Dec. 23, 1913.

Application filed January 18, 1913. Serial No. 742,942.

*To all whom it may concern:*

Be it known that I, FREDERICK D. GREEN, a citizen of the United States, residing at Corinth, in the county of Alcorn and State of Mississippi, have invented a new and useful Variable-Speed Gearing, of which the following is a specification.

This invention has reference to improvements in variable speed gearing for power transmission, and its object is to provide a variable speed mechanism whereby the speed of the driven element may be varied from zero to that of the drive element gradually and without shocks or jars or any marked variations.

In accordance with the present invention power is transmitted from the drive element to the driven element, which elements for convenience of description will be hereinafter termed the drive shaft and the driven shaft, by means of friction devices and differential connections arranged so that the driven element may be at all times in effectively full power relation to the drive members whether the speeds of the drive and driven shafts be the same or are moving at the slowest speeds above zero, the power, of course, being related to the speed.

The drive shaft carries a friction disk and the driven shaft carries three friction disks, one of which is fast to the driven shaft and the others of which on opposite sides of the first of the three are connected thereto through differential gearing. Moreover, the driving disk is provided with a central cut away or inactive portion comprising a material portion of the central part of the driving disk, so that none of the driven friction disks while within the central zone represented by the cut away portion shall be driven by direct engagement with the driving disk.

In friction driving mechanism it is customary to have two disks with their axes at right angles one to the other and to move one disk radially along the other so that the driven disks will rotate at highest speed when at the periphery of the drive disk and gradually rotates more slowly as it approaches the center of the drive disk, but while the power transmitted is very nearly proportionate to the distance of the driven disk from the center of the drive disk through the major portion of the movement of the disk toward the center of the drive disk, the efficiency of this type of driving mechanism lowers with great rapidity and far out of proportion to the degree of approach of the driven disk to the center of the drive disk as such center is more closely approached, so that by the time the driven disk has been moved from the periphery of the drive disk for a distance equal to about two-thirds of the radius of the drive disk the efficiency of the driving mechanism drops too rapidly to present a sufficiently high efficiency for practical purposes. This is due to the rapidly increasing curvature of the path of that portion of the drive disk engaged by the driven disk as the latter approaches the center of the drive disk. This defect in friction driving mechanism is overcome by the present invention and not only is the efficiency maintained high but the speed of the driven shaft may be varied from zero to that of the drive shaft and the direction of rotation may be reversed as desired.

The structure wherein the features which mark the present invention may be embodied will be best understood from a consideration of the following detailed description taken in connection with the accompanying drawings forming a part of this specification, with the further understanding that while the drawings show a practical embodiment of the invention, the latter is not confined to any strict conformity with the showing of the drawings but may be changed and modified so long as such changes and modifications mark no material departure from the salient features of the invention.

Figure 4:
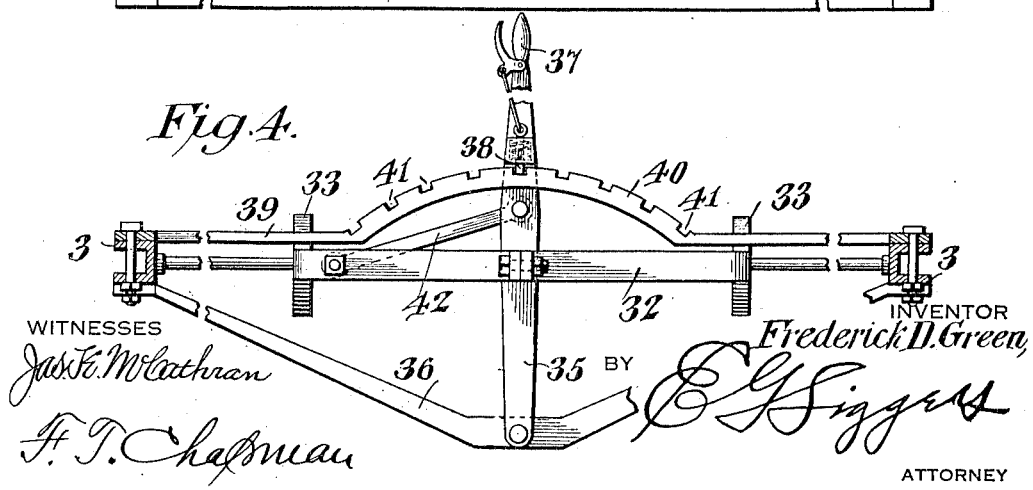
Figure 2:
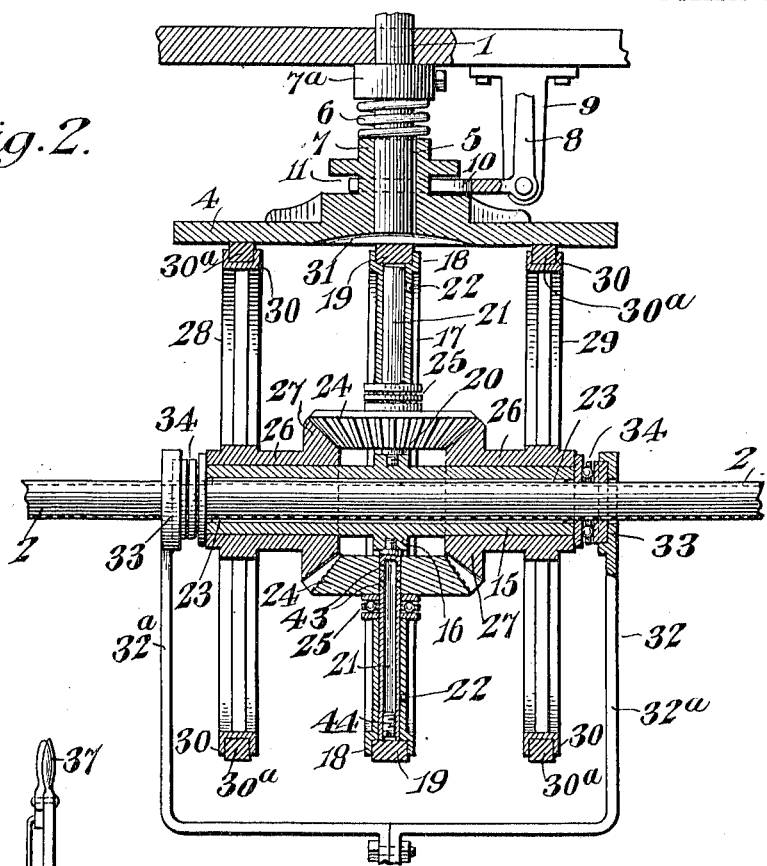
Figure 3:
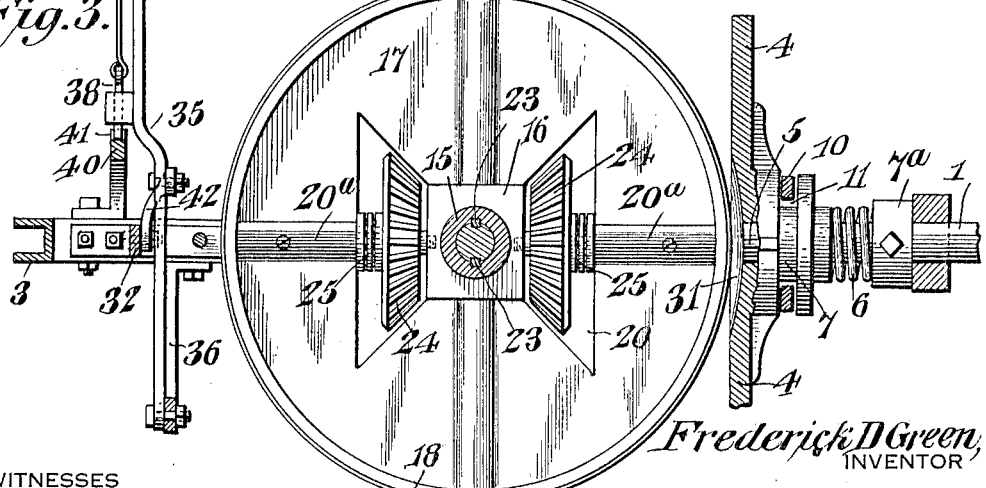

In the drawings:—Figure 1 is a plan view of an embodiment of the present invention. Fig. 2 is a section longitudinally of the drive shaft and in a plane coincident with the axis of the driven shaft and omitting some of the parts shown in Fig. 1. Fig. 3 is a section on the line 3—3 of Fig. 1 with some parts shown in elevation. Fig. 4 is a section on the line 4—4 of Fig. 1 with distant parts omitted.

The drive and driven elements are, as before stated, to be referred to as the drive and driven shafts and the friction elements have been and will be referred to as disks, these terms being employed for convenience of description, but it will be understood that the invention is not confined to any such particular structures since other known friction elements may be employed and the drive and driven members may be other structures than shafts, but the particular structures referred to are simple expedients for the purpose and may oftentimes be employed to advantage under various conditions where power transmission is desirable. As an example of an arrangement where the power transmission mechanism of the present invention is advantageous and where the structure shown may be quite closely followed except, perhaps, in the matter of proportions it may be stated that the present invention is particularly adapted for use as a power transmission mechanism for automobiles, the drive shaft in such instance being that of receiving power from the engine and the driven shaft representing the axle or a jack axle.

Referring to the drawings there is shown a drive shaft 1 and a driven shaft 2, these shafts being mounted in suitable bearings in a frame 3, which may represent any suitable supporting structure and requires no detailed description. The drive shaft 1 is shown as carrying a disk 4 located at one end of the shaft and capable of longitudinal movement thereon but constrained to rotate with the shaft by means of a spline 5 shown in Fig. 2. This disk 4 is constantly urged in one direction by a spring 6 engaging a hub 7 formed on or carrying the disk 4 and abutting against a collar 7ª fast on the shaft 1. This permits the shaft to be mounted against longitudinal movement, while the disk 4 will have a movement longitudinal of the shaft 1 and in the construction shown it is desirable that the spring 6 should be of sufficient size to apply the desired driving pressure to the disk 4.

In order to move the disk 4 along the shaft 1 in opposition to the tendency of the spring 6 there is provided a lever 8 mounted in a bracket 9 fast to the frame 3 and terminating at one end in a fork 10 straddling the hub 7 and lodged in a groove 11 therein, so as not to interfere with the rotation of the disk. The other end of the lever 8 terminates in a manipulating handle or arm 12 associated with which is a latch bar 13 and a thumb latch 14 as is customary in adjusting levers. The arrangement is such that in one position of the hand lever or handle or arm 12 the spring 6 is compressed and the disk 4 is moved out of operative position while in the other adjustment of the handle 12 the disk 4 is released to the full action of the spring 6 and is then in operative position as will hereinafter appear.

The longitudinal axis of the drive and driven shafts are arranged at right angles one to the other in the particular structure shown in the drawings, so that if the longitudinal axis of the shaft 1 were sufficiently prolonged it would intersect the longitudinal axis of the shaft 2.

Mounted upon the shaft 2 is an elongated hub 15 which has a central portion 16 from which there radiates a disk 17 comprising a web terminating in a laterally expanded and peripherally channeled rim 18 carrying suitable friction material 19 such as is usually employed in friction wheels or disks. On diametrically opposite sides of the central portion 16 the disk 17 is cut away or recessed as shown at 20 and extending from the cut-away portion 20 are radial tubular thickened portions 20ª of the web opening through the rim 18 and receiving tubes 21 extended through the cut-away portions 20 and threaded into the central portion 16. The tubes 21 are each held in place by a set screw 22 passed laterally through the respective thickened portion 20ª. The hub 15 is secured to the shaft 2 for simultaneous rotation by splines 23, but so arranged that the hub 15 and the friction disk 17 thereon may be moved lengthwise of the shaft 2.

The diametrically opposite tubes 21 each carry a bevel pinion 24 lodged in the cut-away portion or recess 20 close to the enlargement 16 and between the outer face of the pinion and the respective edge of the recess 20 the tube 21 carries an anti-friction thrust bearing 25, which bearing may be of ordinary construction, and therefore needs no special description.

Mounted on the hub 15 are other hubs 26 on opposite sides of the pinions 24 and each hub 26 is formed with a bevel pinion 27 like the bevel pinions 24 and meshing with the latter, the four pinions providing a known form of differential gearing. The hubs 26 are arranged to freely rotate upon the hub 15 as needed and each hub 26 at a distance from the bevel pinion carried by it in turn carries a friction disk, the two friction disks being designated 28 and 29, respectively, and each having a suitably broadened and channeled peripheral portion 30 carrying friction material 30ª adapted to engage the disk 4 in the face thereof remote from the hub 7, the said disk 4 being preferably flat and formed entirely of metal so far as its active face is concerned.

The disks 17, 28 and 29 are all of the same diameter and the disk 4 at the central portion is recessed or cut away on its active face as indicated at 31, so that when any one of the disks is within the zone represented by the cut-away portion 31 it is out of contact with the disk 4, even though the other disk or disks be in engagement therewith.

The three disks described are movable lengthwise of the shaft 2 by any suitable mechanism, and one such mechanism is illustrated in the drawings. It consists of a yoke 32 provided with legs 32ª parallel one with the other and spaced apart a greater distance than the length of the hub 15. These legs terminate in rings 33 surrounding the shaft 2 at opposite ends of the hub 15 and spaced therefrom, while interposed between these rings 33 and the corresponding ends of the hub 15 are anti-friction thrust bearings 34 of known type, and thence needing no special description. These thrust bearings together with the yoke 32 may also serve to maintain the hubs 26 on the hub 15 with the pinions 27 carried by the hubs 26 in mesh with the pinions 24. The yoke 32 is under the control of a manipulating lever 35 at one end pivoted to a bracket 36 connected to the frame 3 and at the other end provided with a manipulating handle 37 having a thumb latch 38 of ordinary construction. Mounted on the frame 3 is a bar 39 having an intermediate rack segment 40 with notches 41 which may be engaged by the latch 38 at different positions of adjustment of the lever 35 and this lever is connected by a link 42 to the yoke 32, so that the yoke may be moved lengthwise of the shaft 2 in either direction by a suitable adjustment of the lever 35 and the hub 15 will participate in such movement carrying with it the three disks 17, 28 and 29, which latter maintain their relative positions with respect one to the other.

The tubes 21 carrying the pinions 24 are designed to supply lubricant to these pinions which turn freely upon the tubes 21 and for this purpose each tube 21 has perforations 43 through its walls where traversing the respective pinions 24, while the other end of the tubes 21 is provided with a closing screw plug 44.

The diametric extent of the recess or depression 31 of the disk 4 is about one-third of the full diameter of the disk and is concentric with the axis of rotation of the disk, so that there is an inactive zone in the active face of the disk of a diameter of about one-third the diameter of the disk.

Let it be assumed that the drive shaft 1 is being rotated by power and that the disk 4 rotating with the drive shaft is in engagement with the friction disks 28 and 29, the latter being located as in Figs. 1 and 2, that is, at equal distances and on opposite sides of the axis of rotation of the disk 4, and, moreover, that this disk 4 is being pressed against the disks 28 and 29 with the full force of the spring 6, which latter may be taken as indicative of any means of causing the working engagement of the disk 4 with the other disks or any of them.

Under the conditions assumed the two disks 28 and 29 are rotating in opposite directions, while the disk 17 being at this time central to the disk 4 is within the inactive zone 31, and hence out of engagement with the disk 4. Since the two disks 28 and 29 are rotating at the same speed but in opposite directions the motion transmitted to the pinions 27 and from them to the pinions 24, results in the latter simply rotating at equal speeds and in opposite directions but without effect upon the disk 17. In this position of the parts the shaft 2 has zero speed and no power is being transmitted from the shaft 1. Suppose, now, that the lever 35 is manipulated to move the hub 15, say, to the right as viewed in Figs. 1 or 2. This will carry the disk 28 toward the axis of rotation of the disk 4 and the disk 29 toward the periphery of the disk 4 on the opposite side of the said disk 4 from the disk 28. When the movement has been a moderate movement the disk 20 is still within the inactive zone represented by the recess or cut-away portion 31. Now the disk 29 rotates with greater speed than the disk 28 and hence the difference in speed of these two disks reacts upon the pinions 23 and therefore rotative movement commensurate with such difference in speed is imparted to the disk 17 and by the latter to the shaft 2, this being the familiar action of a differential gear such as shown in the drawings, the speed of the shaft 2 being proportionate to the different speeds of the disks 28 and 29. If the adjusting movement of the hub 15 just referred to has been slight a very slow movement is imparted to the shaft 2. If it be assumed that the shaft 1 is rotating at, say, one hundred revolutions per minute, then the adjustment of the hub 15 may be so small that the shaft 2 will rotate, say, once per minute, while the power transmitted to the shaft 2 will be, say, one hundred times that of the shaft 1, ignoring friction losses. Suppose the movement of the hub 15 along the shaft 2 is sufficient to carry the disk 29 to the edge of the disk 4 still in engagement therewith, then the disk 28 is carried to the outer edge of the recess 31 and the disk 17 is carried nearly to the opposite inner edge thereof. Under these circumstances the disk 29 will be rotating at the speed of the disk 4. The parts are so proportioned that under the circumstances just assumed the disk 29 is rotating at one-half greater speed than it did in what may be termed the zero position, and the disk 28 is now rotating at one-half less speed than it did under the first conditions assumed. The result of this is that the disk 17 is being driven by the differential gearing at half the difference of the speeds of the two disks 28 and 29, slip being ignored. A further movement of the hub 15 toward the right will cause the disk 29 to leave the disk 4 by moving radially away from the latter and the disk 28 is moved into the inactive zone represented by the recess or depression 31. This would result in a stoppage of the driven member, but the disk 17 now engages the active face of the disk 4, wherefore power is now being transmitted from the disk 4 directly to the disk 17 and by the latter directly to the shaft 2, the parts being so proportioned that the speed of rotation of the disk 17 as it began to be actively engaged by the disk 4 was the same as that transmitted to the shaft through the combined action of the disks 28 and 29 and the differential gearing. The right hand movement of the hub 15 along the shaft 2 continuing, the disk 17 is moved toward the periphery of the disk 4 until it may reach the peripheral portion thereof when the disks 4 and 17 being of the same diameter the speed of the disk 17 is that of the disk 4 and shaft 1, and the shaft 2 therefore rotates at the same speed as the shaft 1. Of course, a movement of the hub 15 in the reverse direction to that described will result in the same series of operations, but with the shaft 2 rotating in the reverse direction to that first considered, considering the shaft 1 as always rotating in the same direction.

By the arrangement described the speed of the driven shaft is raised from zero to that of the shaft 1 and power developed in the shaft 2 is inversely proportional to the increase in speed, friction being ignored although affecting the actual power transmitted to a certain small extent.

With the structure described the great proportional loss or inordinately increased loss of efficiency due to the close approach of one disk toward the center of the other is to a great extent avoided by providing a means whereby the full effect, so far as speed is concerned, obtainable by moving one disk from the center to the periphery of the other, is attained, for at no time does one disk approach the center of the other disk more nearly than about one-third of the radius of the disk, it being found that the efficiency loss up to this point is so little as to be negligible, while from such point to the axis of the disk the curvature of loss rises very rapidly.

By the present invention the advantage of driven disks oppositely disposed with reference to the direction of rotation of the axis of the drive disk or the reverse with these disks connected by differential gearing to the drive shaft so that gradual varying speeds without any sudden transitions may be obtained, are realized, with the further advantage that the travel of these disks need not bring them into the inefficient portion of the drive disk. The present invention provides a further and improved advantage in that while the speed of the driven shaft with the differential gearing can only equal approximately one-third of the speed of the drive shaft, and still retain high efficiency, it is possible to continue the driving motion until the speeds are equal, this being brought about by cutting out the differential arrangement and putting in a direct drive. Furthermore, by the present invention the differential gearing remains inactive during the range of speeds of the driven shaft from about one-third to maximum.

That portion of the disk 4 exterior to the recess or depression 31 is of annular form and the width of the path so provided for the friction disks carried by the shaft 2 is approximately that of the inactive centralized portion of the disk 4 represented by the recess or depression 31. Of course, the recess 31 need not be exactly one-third of the diameter and may be even materially greater or less, but the smaller the relative diameter of the recess 31 the more rapid is the drop of efficiency of transmission. It is found, however, that when the recess or depression 31 represents about one-third of the diameter of the disk 4 the loss in efficiency with respect to any of the disks on moving toward the recess is so small as to be practically negligible, but beyond this point the rising curve of inefficiency is rapid.

The differential gearing represented by the gear wheels 24 and 27 may be protected against the effects of dust and dirt by the commonly employed expedient of inclosing them in a suitable casing which may be readily arranged to retain a lubricant, so that the parts are constantly immersed therein as is the practice in automobile transmission gearings.

What is claimed is:—

1. A variable speed gearing comprising a friction member, other friction members on opposite sides of the axis of rotation of the first friction member, differential gearing connecting the second-named friction members, and another friction member connected to the differential gearing and movable into and out of active engagement with the first-named friction member as the other friction members are moved out of or into active engagement with the first-named friction member.

2. A variable speed gearing comprising a friction disk, other spaced friction disks arranged to engage the first-named friction disk on opposite sides of the axis of rotation and movable in the direction of a diameter of the first-named friction disk simultaneously into and out of active engagement therewith, differential gearing connecting said second-named disks, and a third disk connected to the differential gearing intermediate of the other disks connected to such gearing and movable therewith across the first-named disk into engagement with the latter on the movement of the second-named disks out of engagement therewith and out of engagement with the first-named disk as said second-named disks are moved into engagement therewith.

3. A variable speed gearing comprising a drive shaft, a friction disk carried thereby, a driven shaft, a friction disk carried thereby, other friction disks on opposite sides of the second-named friction disk mounted on the driven shaft, differential gearing between the disks on the driven shaft, and means for moving all the disks on the driven shaft simultaneously across the disk mounted on the drive shaft and the latter being provided with a centralized portion shaped to be out of engagement with any of the disks when within the range of such centralized portion.

4. A variable speed mechanism comprising a drive shaft, a friction disk mounted thereon provided with a centralized recess or cut-away portion, a driven shaft, a friction disk mounted thereon for movement along the driven shaft, other friction disks on opposite sides of the first-named disk on the driven shaft, differential gearing between the oppositely disposed disks and the central disk on the driven shaft, and means for moving the three disks along the driven shaft in a direction diametric to the disk mounted on the power shaft to bring any one of the disks on the driven shaft into the zone defined by the recess or cut-away portion of the first-named disk.

5. A variable speed mechanism comprising a power shaft, a disk mounted thereon for rotating therewith and provided with a centralized recess or cut-away portion in its active face, a driven shaft, a hub mounted thereon for movement longitudinally of the driven shaft and connected thereto for rotation therewith, means for moving the hub along the driven shaft, a disk on the hub for rotation therewith, and carrying oppositely disposed gears, hubs mounted loosely on the first hub on opposite sides of said gears and each carrying a friction disk, and means for moving the three disks and the parts carrying them along the driven shaft simultaneously, the disks of the driven shaft being related one to the other and to the recess or cut-away portion of the active face of the first-named disk to maintain the intermediate disk on the driven shaft out of engagement with the first-named disk while the other disks are in engagement therewith and to move the latter disks out of engagement with the first-named disk as the intermediate disk is moved into engagement therewith.

6. A variable speed gearing comprising a drive disk having a centralized recess or cut-away portion in its active face of an extent approximately one-third the diameter of the disk, and a series of three disks movable diametrically of the first-named disk and differential gearing connections therebetween, the spacing of the three disks being approximately that of the diametrical extent of the cut-away portion of the first-named disk.

7. A variable speed gearing comprising a friction member having a zone of inactivity in its active portion, and other friction disks movable actively along the first-named friction means into and out of inactive zone, and one of said disks having a range of movement entirely across said inactive zone.

8. A variable speed gearing comprising a friction disk having a centralized inactive zone on its active face, and a series of friction disks movable across the first-named disk into and out of coincidence with the inactive zone, said series of friction disks having differential interconnections, and one of said disks having a range of movement wholly across the inactive zone.

9. A variable speed gearing comprising a disk having an active face provided with a centralized inactive zone, spaced disks adapted to engage the active face of the first named disk and movable together diametrically thereof in the same direction and related to the inactive zone to cause one disk to move thereinto as the other disk moves beyond the edge of the first named disk, and another disk intermediate of the second named disks and related thereto to move into operative relation to the active face of the first named disk only as the second-named disks move out of engagement with the active face of the first-named disk.

10. A variable speed gearing comprising a disk having a centralized zone of inactivity on its active face and a series of interconnected disks movable across the face of the first named disk in operative relation thereto with one disk in the inactive zone of the first named disk while another disk is in engagement with the active portion of the first-named disk.

11. A variable speed gearing comprising a disk provided with a centralized inactive zone in its active face approximating one-third the diameter of the disk, and a series of three other disks adapted to engage the active face of the first-named disk and movable simultaneously diametrically thereof, the range of movement being sufficient to carry any one of the series of three disks entirely across that portion of the active face of the first named disk between the centralized zone and the periphery of the disk.

12. A variable speed gearing comprising a disk having a centralized inactive zone, a series of three disks adapted to engage the face of the first-named disk outside the inactive zone and movable diametrically across the first named disk, one of the series of disks being differentially connected to the other members of the series.

In testimony, that I claim the foregoing as my own, I have hereto affixed my signature in the presence of two witnesses.

FREDERICK D. GREEN.

Witnesses:
 JOHN H. SIGGERS,
 EDITH L. BROWN.

Copies of this patent may be obtained for five cents each, by addressing the "Commissioner of Patents, Washington, D. C."